United States Patent [19]

Takamiya et al.

[11] Patent Number: 4,838,122
[45] Date of Patent: Jun. 13, 1989

[54] SPEED CHANGE DEVICE FOR BICYCLE

[75] Inventors: Kikuzo Takamiya, Kitamoto; Sadao Mabuchi; Kazuhiro Inoue, both of Ageo, all of Japan

[73] Assignee: Bridgestone Cycle Co., Ltd., Tokyo, Japan

[21] Appl. No.: 95,851

[22] Filed: Sep. 14, 1987

[30] Foreign Application Priority Data

| Sep. 18, 1986 [JP] | Japan | 61-218225 |
| Sep. 18, 1986 [JP] | Japan | 61-218226 |
| Sep. 18, 1986 [JP] | Japan | 61-218227 |
| Sep. 18, 1986 [JP] | Japan | 61-218228 |
| Sep. 18, 1986 [JP] | Japan | 61-218229 |
| Sep. 18, 1986 [JP] | Japan | 61-218230 |

[51] Int. Cl.⁴ .......... F16H 3/44; F16H 57/10; F16D 13/04; F16D 23/00
[52] U.S. Cl. .................. 74/781 B; 74/766; 192/47; 192/64
[58] Field of Search .......... 74/750 B, 754, 766, 74/767, 781 B; 192/48.92, 47, 64

[56] References Cited

U.S. PATENT DOCUMENTS

| 2,201,304 | 5/1940 | Sekella | 74/781 B |
| 2,988,186 | 6/1961 | Dotter | 192/47 |
| 3,135,368 | 6/1964 | Shimano | 74/781 B |
| 3,166,171 | 1/1965 | Schwerdhöfer et al. | 192/64 |
| 3,182,529 | 5/1965 | Schwerdhöfer et al. | 192/64 |
| 3,438,283 | 4/1969 | Schwerdhöfer et al. | 74/781 B |
| 3,727,484 | 4/1973 | Shea et al. | 74/750 B |
| 4,098,147 | 7/1978 | Waddington | 74/750 B |
| 4,157,667 | 6/1979 | Rinaldi | 74/781 B |
| 4,305,312 | 12/1981 | Lapeyre | 74/750 B |
| 4,706,982 | 11/1987 | Hartmann | 74/781 B |

FOREIGN PATENT DOCUMENTS

| 0848016 | 7/1949 | Fed. Rep. of Germany | 74/781 B |
| 0546224 | 8/1922 | France | 74/766 |
| 1953 | 1/1953 | Japan. | |
| 0073567 | 5/1948 | Norway | 74/750 B |
| 0234698 | 5/1945 | Switzerland | 74/766 |
| 0254702 | 12/1948 | Switzerland | 74/766 |
| 0024929 | 10/1905 | United Kingdom | 74/766 |

Primary Examiner—Leslie A. Braun
Assistant Examiner—Harold F. Macris
Attorney, Agent, or Firm—Parkhurst, Oliff & Berridge

[57] ABSTRACT

A speed change device for a bicycle comprises a carrier jointed to a crank arm and a plurality of planet gears rotatably supported on a plurality of shafts arranged in a circle on said carrier. Each of the planet gears includes a plurality of planet gear elements different in number of teeth. The device further comprises an internal gear in mesh with ones of the planet gear elements of the planet gears and formed in an outer circumference with a sprocket to form a driven rotary body, one-way clutches for connecting the driven rotary body to the carrier, a plurality of sun gears provided on a crankshaft and in mesh with the planet gear elements of the planet gears, respectively, and one-way clutches provided between inner circumferences of the sun gears and a fixed bearing enclosing the crankshaft. One of the one-way clutches last mentioned is able to connect selectively.

7 Claims, 11 Drawing Sheets

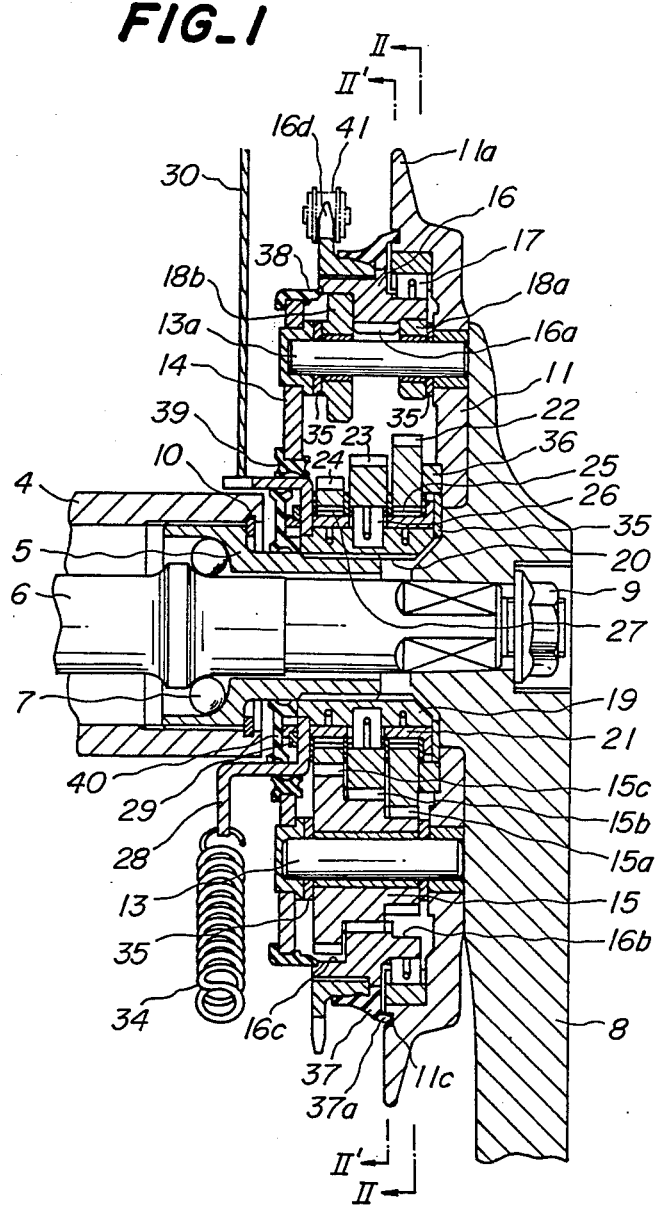
FIG_1

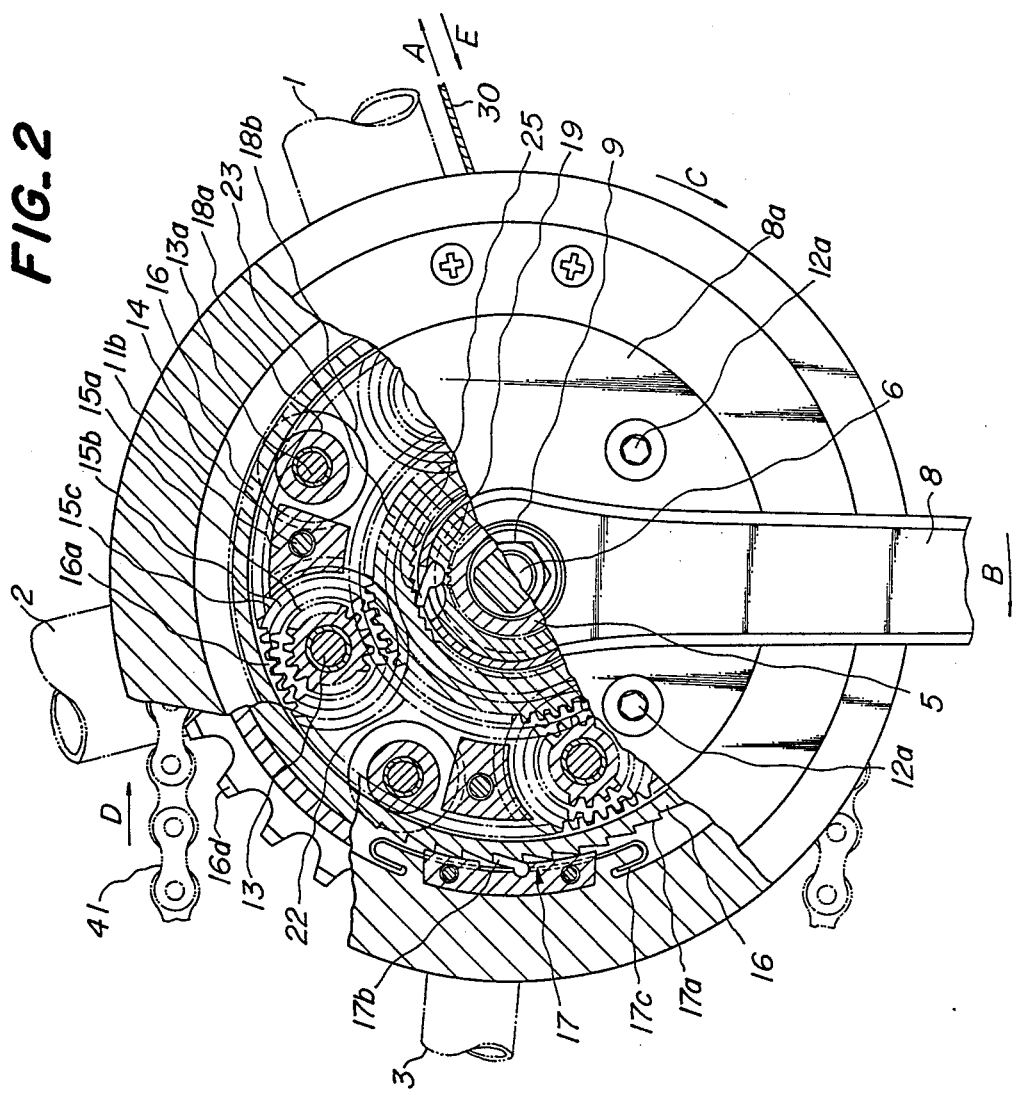

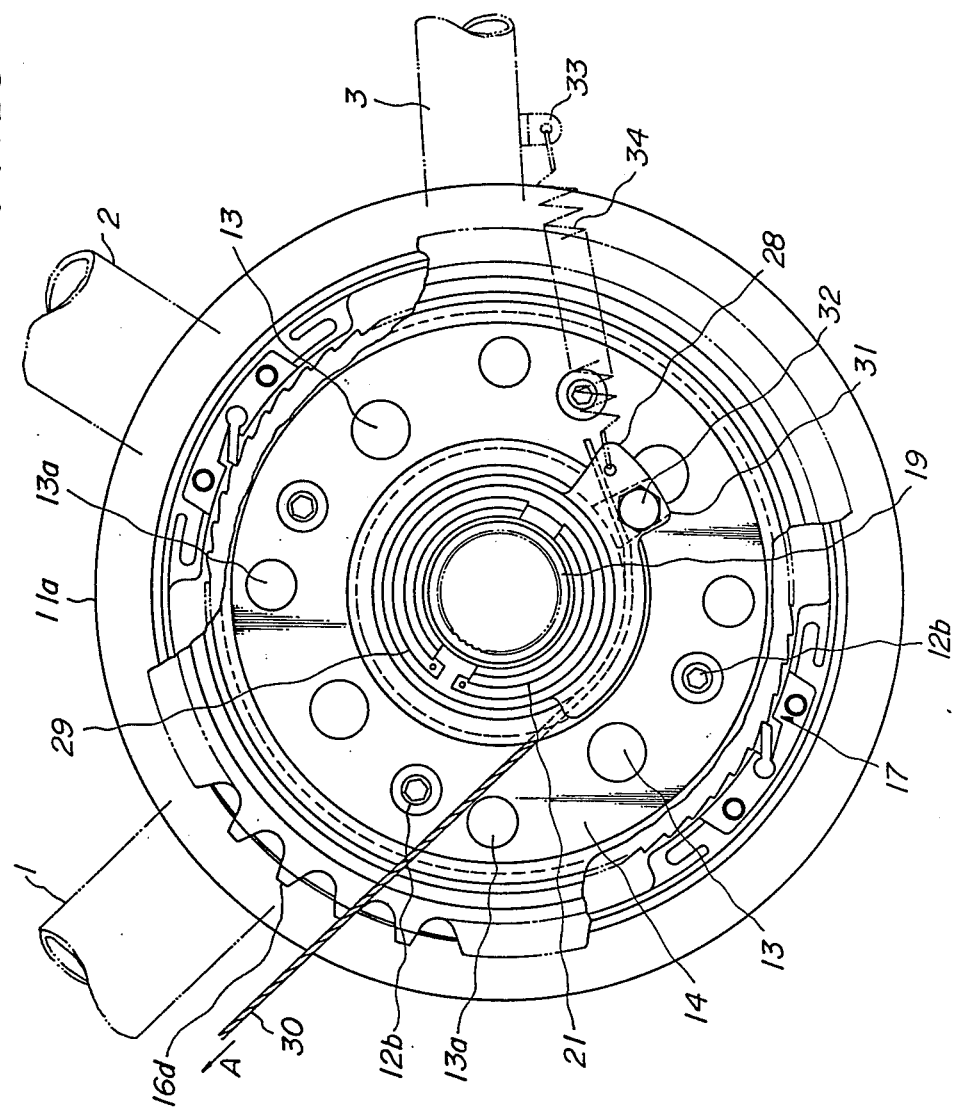

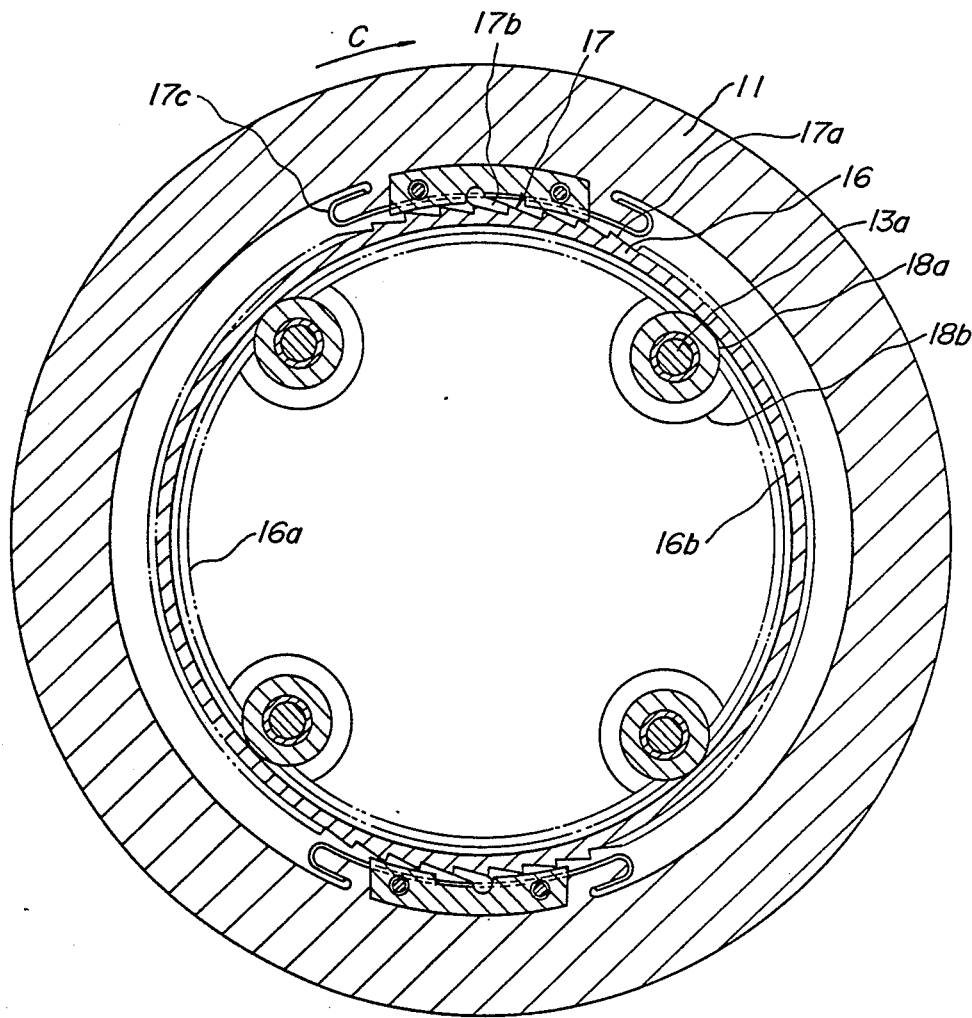
FIG_4

FIG_5
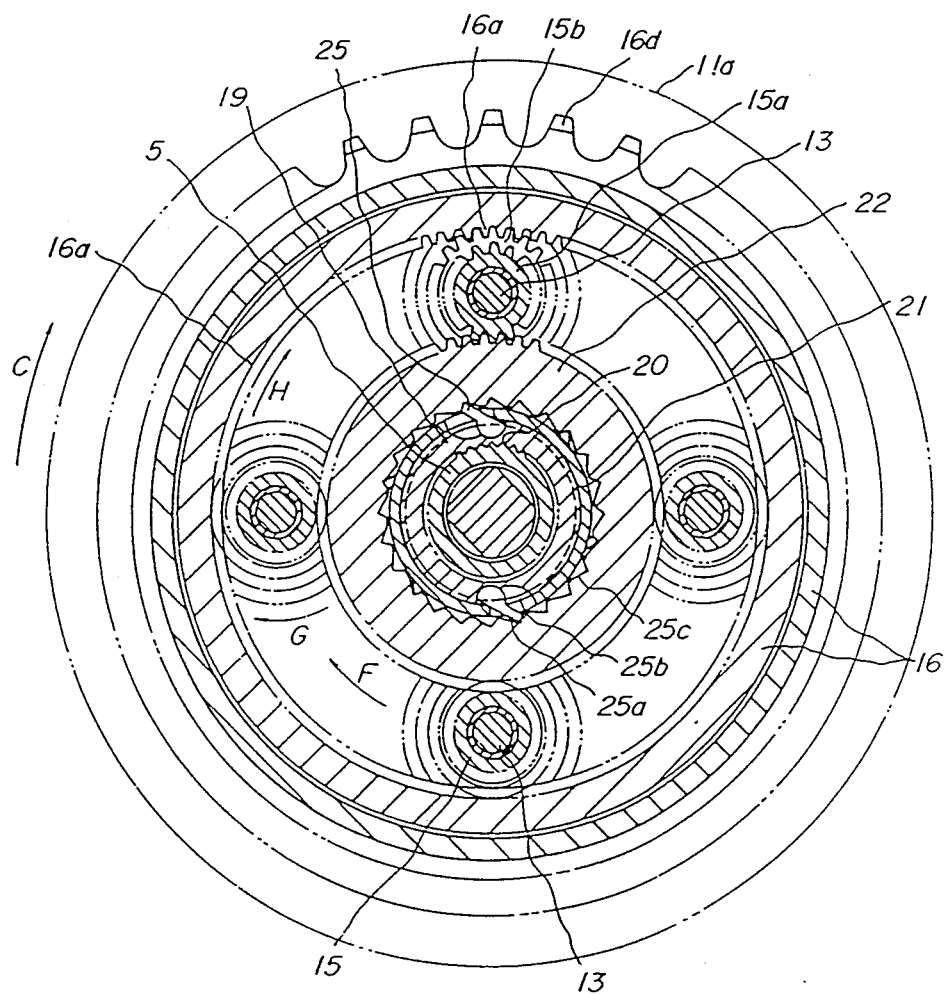

FIG_6a
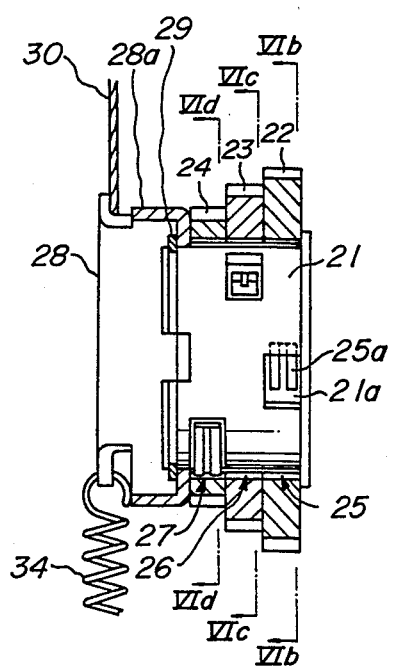
FIG_6b
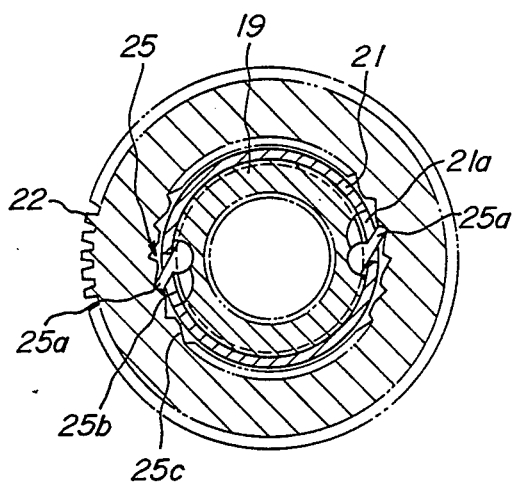
FIG_6c
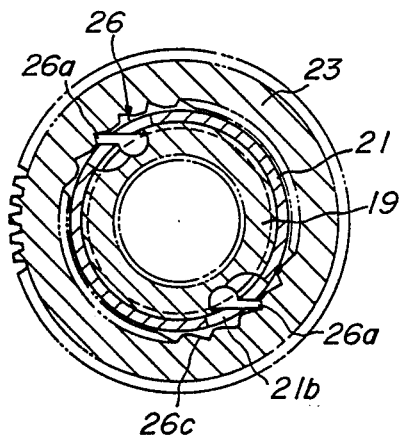
FIG_6d
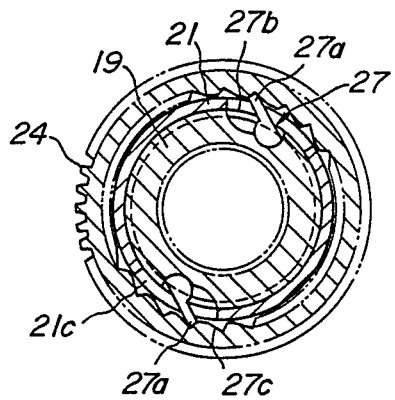

FIG_8a
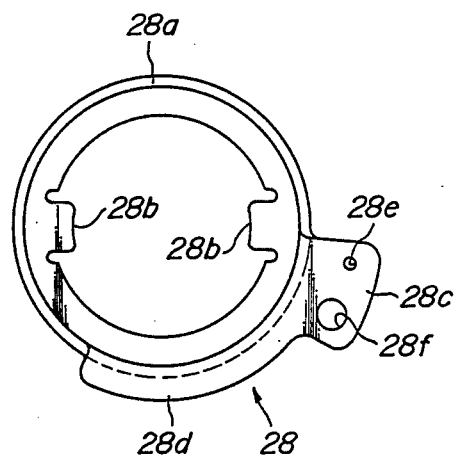
FIG_8b
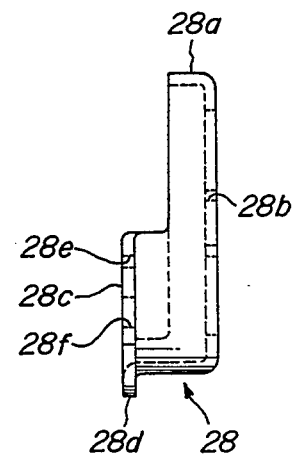

FIG_9a
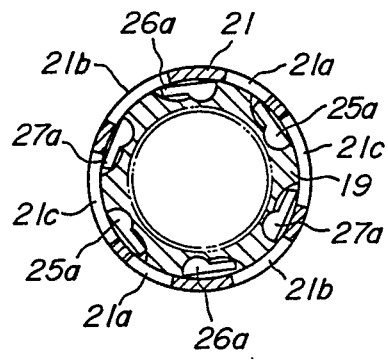
FIG_9b
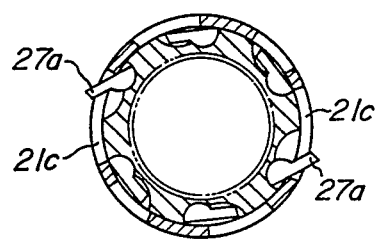
FIG_9c
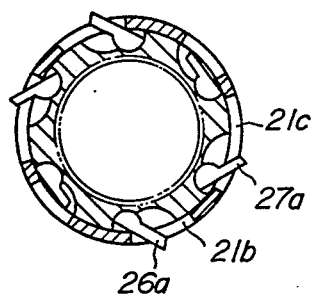
FIG_9d
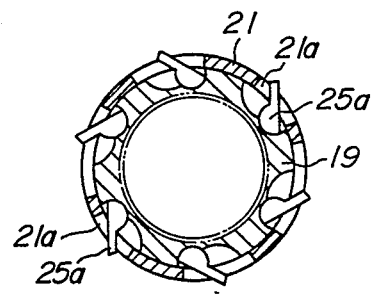

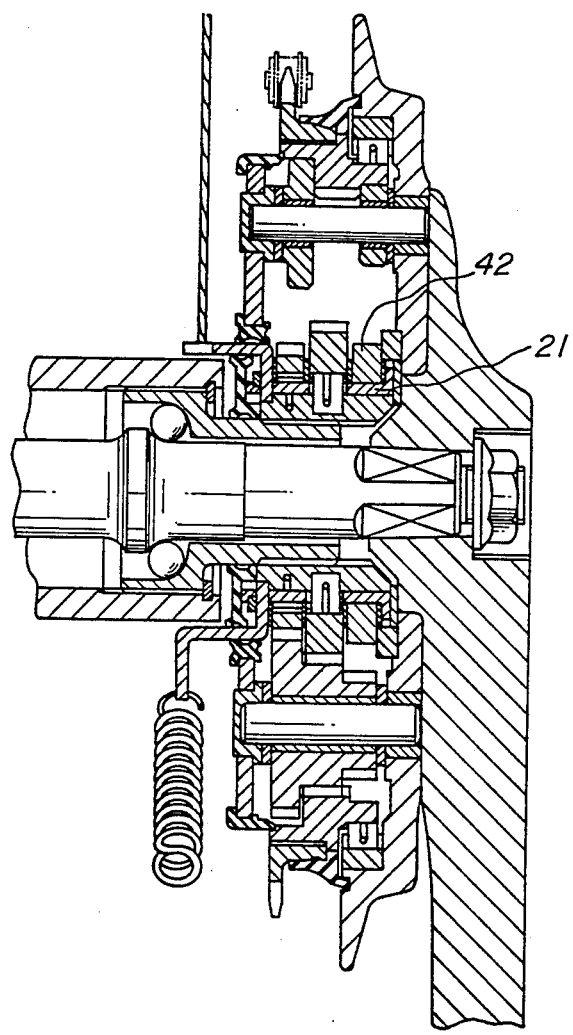
FIG_10

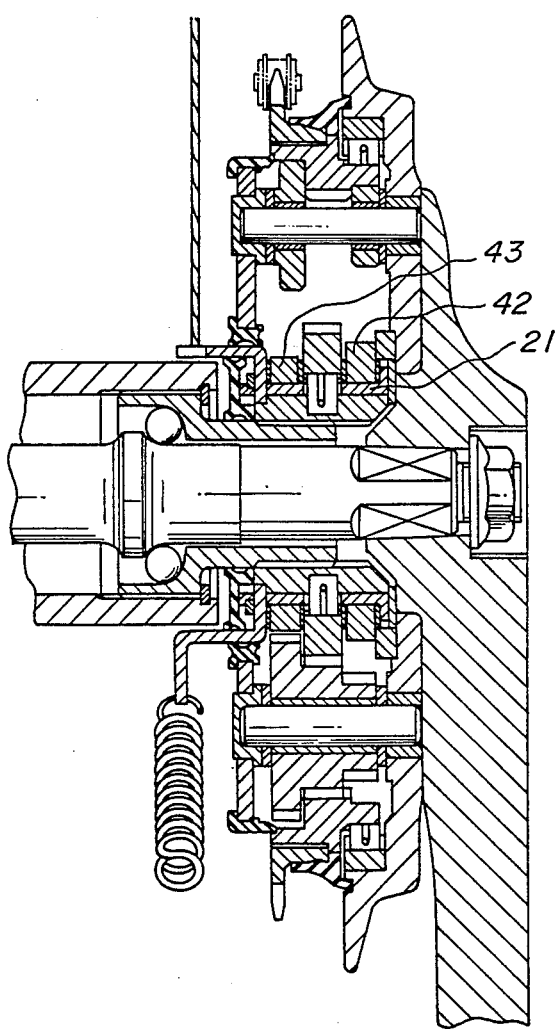
FIG_11

SPEED CHANGE DEVICE FOR BICYCLE

BACKGROUND OF THE INVENTION

This invention relates to a speed change device provided on a crankshaft of a bicycle.

A widely used speed change device for a bicycle includes multistage sprockets and an endless chain which is trained about one set of sprockets and is transferred to other sets of sprockets by means of a delayer for the purpose of changing speeds. This is of a type of a speed change device provided externally of a bicycle. This type of the speed change device has disadvantages in that the chain is likely to disengage from the sprockets in running and does not smoothly transfer from one set of sprockets to the other so that a smooth speed change is difficult. Moreover, this device produces noise when speed changing, and exposed sprockets outwardly extending are likely to touch trousers of a cyclist.

There is another type of a speed change device built in a hub of a rear wheel, which is not used so much. This mechanism is sophisticated and apt to cause trouble.

A speed change device including a planetary gear mechanism cooperating with a crankshaft has been disclosed in Japanese Utility Model Application Publication No. 19/53. This type of the speed change device is superior to those above described. However, this speed change device disclosed the Japanese Publication No. 19/53 is complicated in construction and has a limitation in that speed change more than three steps is impossible from the arrangement of the planetary gear. It is therefore difficult to realize the idea disclosed in the Japanese Publication as a trade product.

SUMMARY OF THE INVENTION

It is a principal object of the invention to provide a speed change device for a bicycle, which eliminates all the disadvantages of the prior art.

In order to achieve this object, the speed change device for a bicycle according to the invention comprises a carrier jointed to a crank arm, a plurality of planet gears rotatably supported on a plurality of shafts arranged in a circle on said carrier, each of said planet gears including a plurality of planet gear elements different in number of teeth, an internal gear in mesh with ones of said planet gear elements of the planet gears and formed in an outer circumference with a sprocket to form a driven rotary body, one-way clutches for connecting said driven rotary body to said carrier, a plurality of sun gears provided on a crankshaft and in mesh with said planet gear elements of said planet gears, respectively, and one-way clutches provided between inner circumferences of said sun gears and a fixed bearing enclosing said crankshaft and one of said one-way clutches last mentioned being able to connect selectively.

With the speed change device constructed as above described, the number of speed change steps can be three or more and the device can be made thin as a whole within a range not obstructing the practical use. According to the invention, it is possible to realize in practical use a speed change device having a number of speed change steps greater than three without requiring transferring the chain to other combinations of sprockets.

In a preferred embodiment of the invention, the device further comprises at least three shafts provided in a circle on the carrier and rollers rotatably arranged on the shafts for supporting an inner circumference of the driven rotary body, thereby securely supporting the driven rotary body and making smooth the engagement and rotation of the internal gear and planet gears.

In another embodiment, the fixed bearing is formed in its outer circumference with serrations and a pawl sleeve in the form of a hollow cylinder is formed in its inner circumference with serrations and is detachably fitted on the fixed bearing, and the one-way clutches are provided between the sun gears and the pawl sleeve. Therefore, the most of the parts already assembled may be finally fitted into a frame assembly of a bicycle, so that the assembling and disassembling of the device are very easy for manufacturing or maintenance of the device.

In a further embodiment, the device further comprises a speed change cylinder for controlling the one-way clutches provided between the sun gears and the pawl sleeve and the speed change cylinder is connected to a shift arm for changing speeds.

With this arrangement, after the speed change cylinder, the pawl sleeve, the plurality of sun gears and the plurality of one-way clutches have been assembled, this assembly is fitted and connected with the shift arm by means of a snap ring in a simple manner. Therefore, the device is easy to assemble for manufacturing and maintenance of the device and is therefore superior in quality.

The device preferably comprises a pawl sleeve in the form of a hollow cylinder fitted on said fixed bearing, and a speed change cylinder rotatable fitted between the pawl sleeve and the sun gears, and the pawl sleeve is provided on its outer circumference with a plurality of pawls extensible and retractable in opposition to the sun gears, and the speed change cylinder is formed with openings corresponding to the pawls to form the one-way clutches corresponding to the sun gears, thereby selectively connecting one of the one-way clutches by rotating operation of the speed change cylinder.

With this arrangement, the control of the respective one-way clutches can be smoothly effected by means of the speed change cylinder which is thin and of light weight but has a high strength. Moreover, as the openings through which the pawls are extended or retracted are independently distributed in the speed change cylinder, edges of the openings have enough strength to resist forces of the pawls tending to extend out of the speed change cylinder. Moreover, the one-way clutch includes a plurality of pawls to improve the balancing of forces when engaged and therefore the device becomes durable in use.

In a preferred embodiment, the device further comprises dust protective seals between the carrier and the driven rotary body, between an outer circumference of a ring plate located on a side opposite to said carrier and the driven rotary body, between an inner periphery of the ring plate and an outer periphery of a ring portion of a shift arm for controlling the one-way clutches for the sun gears, and between an inner periphery of the ring portion of the shift arm and an outer circumference of the fixed bearing.

Therefore, clothes of a cyclist are prevented from being carried along by a projection of the carrier into spaces between the sprocket and the chain. Moreover, the respective dust protective seals surely prevent the dust, muddy water and the like from entering the device. Therefore, according to the invention it is possible to improve the safety in riding on a bicycle and simultaneously the durability of the bicycle.

The invention will be more fully understood by referring to the following detailed specification and claims taken in connection with the appended drawings.

BRIEF DESCRIPTION OF THE DRAWINGS

FIG. 1 is a sectional view of one embodiment of a speed change device according to the invention;

FIG. 2 is a sectional side view taken along lines II—and II'—II' in FIG. 1;

FIG. 3 is a rear elevation of the device shown in FIG. 2 after removal of part of the device;

FIG. 4 is a partial sectional view taken along the line II—II in FIG. 1;

FIG. 5 is a sectional view taken along the line II'—II' in FIG. 1;

FIG. 6a is a partial sectional view of FIG. 1;

FIG. 6b is a sectional view taken along a line VIb—VIb in FIG. 6a;

FIG. 6c is a sectional view taken along a line VIc—VIc in FIG. 6a;

FIG. 6d is sectional view taken along a line VId—VId in FIG. 6a;

FIG. 8a is a front elevation of a shift arm used in the invention;

FIG. 8b is a side view of the shift

FIGS. 9a, 9b, 9c and 9d are views for explaining the operation between the speed change cylinder and the pawls; and FIGS. 10 and 11 modifications of the speed change device according to the invention.

DESCRIPTION OF THE PREFERRED EMBODIMENTS

Figure 7C:
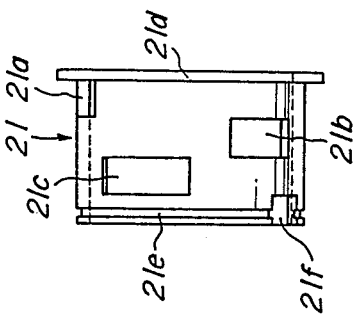
FIG. 7c is a side view of the speed change cylinder on the right side.

FIGS. 1 and 2 illustrate respective members associated with a speed change device, which are a head tube 1, a seat tube 2, chain stays 3, a bottom tube 4, a fixed bearing 5 also serving as a bearing cap and screwed in the bottom tube 4 to be integrally fixed to a bicycle frame, a crankshaft 6 rotatably extending through the fixed bearing 5, balls 7 for the bearing, and a crank arm 8 (only one shown) fitted on one end of the crankshaft 6 and clamped by a nut 9. A snap ring 10 serves to fix the bearing 10 to the bottom tube 4.

In this embodiment, as shown in FIG. 1, a carrier 11 in the form of a disc is formed on its outer circumference with a projection 11a as a gear cover. A center portion of the carrier 11 is fitted on a boss of the crank arm 8 and is fixed to a flange portion of the crank arm 8 by means of bolts 12a (FIG. 2). A plurality (four in this embodiment) of shafts 13 are provided equally angularly spaced in a circle in the carrier 11 and in parallel with the crankshaft 6. In this embodiment, moreover, the carrier is formed at four locations on an inner surface with protrusions 11b (FIG. 2). A ring plate 14 abuts against the protrusions 11b and is fixed thereto by means of bolts 12b (FIG. 3). The shafts 13 extend between the carrier 11 and the ring plate 14.

A plurality (four in this embodiment) of planet gears 15 are rotatably fitted on the shafts 13. Each of the planet gears 15 consists of a plurality (three in this embodiment) of planet gear elements 15a, 15b and 15c having gear teeth different in number and integrally formed in a unitary body. A driven rotary body 16 is formed with an internal gear 16a adapted to be in mesh with planet gear elements 15b and is formed with roller receiving stepped portions 16b and 16c on both sides of the internal gear 16a. The driven rotary body 16 is further formed on its outer circumference with a sprocket 16d and a stepped cylindrical portion. In this manner the driven rotary body 16 is formed as a unitary body.

In this embodiment, however, the sprocket 16d is formed separately from the internal gear and the like and is integrally jointed to these members as shown in FIG. 1, in order to facilitate manufacturing of the driven rotary body 16.

Moreover, one-way clutches 17 are interposed between inner stepped portions provided on inner surfaces of outer periphery of the carrier 11 and the stepped cylindrical portion of the driven rotary body 16 to allow the rotary body to rotate only in one direction relative to the carrier 11.

The one-way clutch 17 consists of ratchet teeth 17a formed in the stepped cylindrical portion of the driven rotary body 16, a pawl 17b pivotally connected to the carrier 11 in extendable and retractable manner, and a spring 17c for urging the pawl 17b into engagement with the ratchet tooth 17a as shown in FIGS. 2 and 4. The one-way clutch 17 may of course be formed in other types of one-way clutch.

In order to support the driven rotary body 16 with its inside, a plurality (four in this embodiment) of shafts 13a extend between the carrier 11 and the ring plate 14 and are arranged equally angularly spaced in a circle and in parallel with the crankshaft 6. On the shafts 13a are rotatably provided smaller diameter rollers 18a and larger diameter rollers 18b which are adapted to engage the roller receiving steps 16b and 16c of the driven rotary body 16, thereby supporting the driven rotary body.

A pawl sleeve 19 in the form of a hollow cylinder is fitted through involute serrations (FIG. 5) on the fixed bearing 5 enclosing the crankshaft 6. On the pawl sleeve 19 is fitted a speed change cylinder 21 on which is further fitted sun gears 22, 23 and 24 in mesh with the planet gear elements 15a, 15b and 15c of the planet gear 15. One-way clutches 25, 26 and 27 are provided between inner circumferences of these sun gears 22, 23 and 24 and an outer circumference of the pawl sleeve 19 and so constructed that the one-way clutchs 25, 26 and 27 are selectively connected.

Referring to FIGS. 6a–6d, the one-way clutches 25, 26 and 27 include pairs of pawls 25a, 26a and 27a. The respective pairs of pawls are diametrically opposed and pivotally connected in recesses formed in an outer circumference of the pawls sleeve 19 in an extendable and retractable manner. FIG. 6b illustrates the one-way clutch 25 associated with the sun gear 22. FIG. 6c illustrates the one-way clutch 26 associated with the sun gear 23. FIG. 6d illustrates the one-way clutch 27 associated with the sun gear 24. Annular springs 25b, 26b and 27b cause the pawls to extend outwardly. The sun gears are formed in their inner circumferences with ratchet teeth 25c, 26c and 27c.

The pawls 25a, 26a and 27a are angularly shifted with 60° and pivotally connected to the outer circumference of the pawl sleeve 19. The speed change cylinder 21 is formed with openings 21a, 21b and 21c corresponding to the pawls 25a, 25b and 25c, respectively. As shown in FIG. 7a, these openings 21a, 21b and 21c are so arranged in the speed change cylinder 21 that reference edges of the openings (preceding edges a, b and c in a clockwise direction) are angularly shifted by 60°, and lengths of the openings 21a, 21b and 21c are in a relation 21a<21b<21c. The openings 21a, 21b and 21c angularly extend in the speed change cylinder 21 over 28°, 41° and 51°, respectively.

Figure 7A:
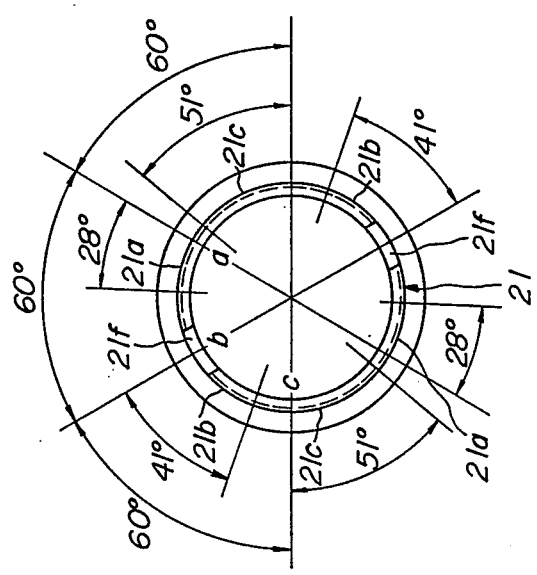
FIG. 7a is a front elevation of a speed change cylinder used in the invention.
Figure 7B:
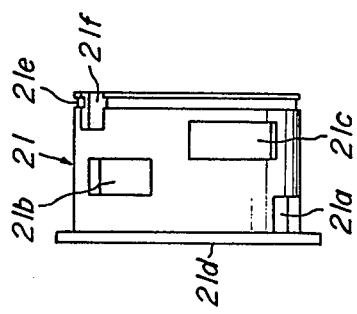
FIG. 7b is a side view of the speed change cylinder on the left side.

Referring to FIGS. 7a–7c, the speed change cylinder 21 is provided with a flange 21d on one side or the side of the crank arm 8 and is formed on the opposite side with an annular groove 21e and notches 21f at two diametrically opposed locations of edges on the side of the annular groove 21e.

FIG. 8 illustrates in detail a shift arm 28 integrally jointed to the speed change cylinder 21 to effect speed change operation. The shift arm 28 comprises a ring portion 28a adapted to be fitted on the speed change cylinder 21, tongues 28b extending from an inside of the ring portion 28a and adapted to be fitted on the notches 21f of the speed change cylinder 21, respectively, an arm 28c laterally extending from an outer side edge of the ring portion 28a, a wire guide 28d extending in the form of a flange continuous with the arm 28c, and a spring anchoring aperture 28e and a wire anchoring aperture 28f formed in the arm 28c.

The shift arm 28 is fitted on the speed change cylinder 21 so that the tongues 28b are fitted on the notches 21f and a snap ring is fitted in the annular groove 21a to joint the speed change cylinder 21 to the shift arm 28 so as to form a unitary body as shown in FIGS. 1, 3 and 6a.

One end of a speed change operating wire 30 is fixed to the shift arm 28 by means of the aperture 28f, an anchoring metal 31 and a set screw 32 as shown in FIG. 3. A return spring 34 extends between the aperture 28e and a bracket 33 provided on the chain stay 3.

In FIG. 1, reference numeral 35 denotes washers provided on side surfaces of the respective rotating members. A collar 36 is interposed between the carrier 11 and the sun gear 22.

In this embodiment, moreover, dust protective seals are used which are made of elastic materials such as soft polyvinyl chloride in order to close clearances between the rotating members.

An annular seal 37 is fitted on an outer circumference of the driven rotary body 16 and an edge 37a of the annular seal 37 is fitted in an annular groove 11c formed in an inner surface of the carrier 11. An annular seal 38 closes the clearances between an outer periphery of the ring plate 14 and the driven rotary body 16. An annular seal 39 closes the clearance between an inner periphery of the ring plate 14 and an outer periphery of the ring portion 28a of the shift arm 28. A seal 40 in the form of a ring plate closes the clearance between an outer circumference of the fixed bearing 5 and an inner periphery of the ring portion 28a of the shift arm 28. Reference numeral 41 denotes a chain engaging the sprocket 16c.

The operation of the device constructed as above described according to the invention will be explained hereinafter. When a speed change operating device (not shown) is operated to pull the speed change operating wire 30 in a direction shown by an arrow A in FIG. 2 or 3, the speed change cylinder 21 is rotated by the shift arm 28 against a force of the return spring 34 in the clockwise direction viewed in FIG. 6a, 6b or 6c. When the speed change cylinder 21 has been rotated to the maximum extent, the relation between the openings 21a, 21b and 21c formed in the speed change cylinder and the six pawls 25a, 26a and 27a in three sets provided on the pawl sleeve 19 fitted on the fixed bearing 5 is obtained as shown in FIG. 9a. In this case, all the pawls 25a, 26a and 27a are located in the speed change cylinder 21, so that there is no pawl engaging any one of the ratchet teeth 25c, 26c and 27c. Therefore, all the sun gears 22, 23 and 24 are freely rotatable.

In this condition, when the crank arm 8 is rotated through a crank pedal (not shown) in a direction shown by an arrow B in FIG. 2, the carrier 11 fixed to the crank arm 8 and the ring plate 14 integrally jointed to the carrier 11 are rotated in a direction shown by arrows C in FIGS. 2, 4 and 5. Therefore, the driven rotary body 16 is rotated in the direction shown by the arrow C in FIGS. 2, 4 and 5 by the engagement of the pawls 17b of the one-way clutches with ratchet teeth 17a. As a result, the driven rotary body 16 and the sprocket 16d are rotated together with the crank arm 8 in the direction shown by the arrow C so that the chain 41 moves in a direction shown by an arrow D in FIG. 2 to drive a rear wheel (not shown), thereby driving the bicycle. In this case, the speed change ratio between the crankshaft 6 and the sprocket 16d is 1:1.

At this time, as the carrier 11 and the driven rotary body 16 are rotated in unison, the planet gear 15 and the internal gear 16a in mesh therewith are also rotated in unison. Therefore, the sun gears 22, 23 and 24 in mesh with the planet gear elements 15a, 15b and 15c of the planet gear 15, respectively, are rotated separately according to respective gear ratios. Such rotations of the sun gears are allowed because all the one-way clutches 25, 26 and 27 are under disengaged condition.

Moreover, the sun gears 22, 23 and 24 are idlingly fitted on the speed change cylinder 21. However, as the sun gears are inscribed and engaged with the four planet gears in this embodiment, respectively, it is not needed to journal the sun gears by a center shaft.

When the operating wire 30 is released one step in a direction shown by an arrow E in FIG. 2 in the condition shown in FIG. 9a, the speed change cylinder 21 is rotated by the action of the return spring 34 in the clockwise direction viewed in FIG. 2 or 9, so that the openings of the speed change cylinder 21 are moved from the positions shown in FIG. 9a to the position shown in FIG. 9b. As a result, tip ends of the pair of pawls 27a extend through the openings 21c so that the pawls 27a engage corresponding ratchet teeth 27c with the aid of the ratchet teeth 27c as shown in FIG. 6d. Therefore, the one-way clutch 27 between the sun gear 24 and the fixed bearing 5 is connected.

Under this condition, when the crank arm 8 is rotated in the direction shown by the arrow B in FIG. 2, the planet gears 15 are revolved through the carrier 11 and the shafts 13 about the sun gears in a direction shown by an arrow F in FIG. 5. In this case, however, as only the sun gear 24 is prevented from rotating in the direction F by the one-way clutch 27, the planet gears 15 are rotated about their axes in a direction shown by an arrow G through the largest diameter planet gear element 15c in mesh with the sun gear 24. As a result, the internal gear 16a in mesh with the intermediate diameter planet gear elements 15b is rotated in a direction shown by an arrow F in FIG. 5 at an increased speed by a combination of the revolution in the direction F about the sun gears and the rotation of the planet gears in the direction G about their axes. As the driven rotary body 16 and the sprocket 16d are rotated together with the rotation of the internal gear 16a, the bicycle runs in the manner as above described. In this case, a speed-up ratio of the driven rotary body 16 to the crank arm 8 is 1:1.4 in this embodiment.

In this case, as the other sun gears 22 and 23 are in mesh with the planet gear elements 15a and 15b, respectively, these sun gears 22 and 23 are also rotated. However, the rotations of the sun gears 22 and 23 do not interfere with other members because one-way clutches 25 and 26 for these sun gears are under disconnected condition.

In this case, moreover, the rotation of the driven rotary body 16 in the direction H is faster than the rotation of the carrier 11 in the direction C in FIG. 5. Such a difference in rotating speed between the driven rotary body 16 and the carrier 11 is allowed by the existence of the one-way clutches 17 (FIGS. 2 and 4).

Thereafter, when the operating wire 30 is released further one step in the direction E in FIG. 2 in the condition shown in FIG. 9b, the speed change cylinder 21 is further rotated so that the openings are moved from the positions in FIG. 9b to the positions in FIG. 9c. As a result, the second pair of pawls 26a extend through the openings 21b, so that the one-way clutches 26 are connected by the pawls 26a.

When the crank arm 8 is rotated in the direction B in FIG. 2 under this condition, the planet gears 15 are revolved in the direction F about the sun gears and rotated in the direction G about axes of the planet gears, with the result that the internal gear 16a is rotated in the direction H. In this case, the rotation of the planet gears 15 in the direction G about their axes is faster than that of the planet gears 15 above described by a speed corresponding to the difference in number of teeth of the gears. The speed-up ratio in this case is larger than that of the above mentioned. The speed-up ratio is about 1:1.6.

In this case, moreover, although the pawls 27a in the openings 21c are engaged with the ratchet teeth 27c, the pawls 27a extend in directions which permit the ratchet teeth 27c of the sun gear 24 to rotate, so that the engagement of the pawls 27a with the ratchet teeth 27c does not interfere with other members.

When the operating wire 30 is further released one step from the condition shown in FIG. 9c, the openings 21a are moved into the positions shown in FIG. 9d or FIG. 9b, so that the third pawls 25a extend through the openings 21a so as to engage the ratchet teeth 25c of the sun gear 22 as shown in FIG. 6b.

As a result, when the crank arm 8 is rotated in the direction B, the internal gear 16a is rotated in the direction H by the revolution and rotation of the planet gears 15 in the directions F and G in FIG. 5. As the rotation of the planet gears 15 in the direction G about their axes is faster than that of the planet gears above described by a speed corresponding to the difference in number of teeth of the gears. The speed-up ratio in this case is 1:1.9 much larger than that of the ratio above described.

In reducing the speed, the operating wire 30 is pulled in a direction shown by the arrow A in FIG. 2 to bring the speed change cylinder 21 from the condition shown in FIG. 9d progressively into the conditions shown in FIGS. 9c, 9b and 9a in a manner reverse to that of speed-up, thereby effecting the slowing down in the order of 4, 3, 2 and 1.

In speed changing operation by the use of the speed change cylinder 21 having the openings 21a, 21b and 21c, one set among three sets of the pawls 25a, 26a and 27a extend through the openings one set by one set to engage the corresponding ratchet teeth in speeding-up and one set of the pawls retracted inwardly of the openings one set by one set in slowing down.

In other words, the increasing and decreasing the speed of a bicycle are effected only by extending and retracting one set of pawls. In the prior art, when one clutch is operated, another clutch is operated in synchronism with the clutch in opposite direction. According to the invention, it is not required to operate such another clutch, so that there are no idling rotation and simultaneous engagement of clutches in speed change, with the result that the speed change is smoothly carried out. Moreover, the device according to the invention is easy to operate and reliable in use.

In a modified embodiment of the device according to the invention, a collar 42 is fitted on the speed change cylinder without providing the sun gear 22 and the one-way clutch 25 to provide a three-stage speed change device of 1:1, 1:1.4 and 1:1.6 devoid of a fourth stage speed change performance as shown in FIG. 10.

In another modified embodiment, a collar 43 is fitted on the speed change cylinder 21 in addition to the collar 42 without providing the sun gear 24 and one-way clutch 27 to provide a two-stage speed change device of 1:1 and 1:1.6 devoid of the second and fourth speed change performance as shown in FIG. 11.

As can be seen from the above explanation, according to the invention there is provided in the driven rotary body 16 only one internal gear 16a, so that the driven rotary body 16 becomes easy to manufacture and is securely supported by the rollers 18a and 18b and the like. Moreover, according to the invention, the planet gear 15 consists of a plurality of planet gear elements 15a, 15b and 15c integrally formed in a unitary body and is journaled by the shaft 13, and a plurality of sun gears 22, 23 and 24 in mesh with these planet gears 15a, 15b and 15c are arranged on the crankshaft 6. Therefore, the shaft 13 of the planet gear elements 15a, 15b and 15c is a common one therefor and the many (four in the embodiment) shafts 13 are arranged in a circle, so that loads which the respective planet gears should support are less and the device can be made thin as a whole. Moreover, according to the invention it is possible to realize a speed change device having a step number of three or more (four in this embodiment) without transferring the chain to other combinations of sprockets.

In this speed change device according to the invention, the driving force is transmitted from the carrier to the driven rotary body 16 through the one-way clutch 17 for the first step, through the sun gear 24, the planet gear elements 15c and the internal gear 16a for the second step, through the sun gear 23, the planet gear elements 15b and the internal gear 16a for the third step, and through the sun gear 22, the planet gear elements 15a and the internal gear 16a for the fourth step. In other words, any driving force is transmitted in linear transmission passages intersecting substantially at right angles to the crankshaft 6 for all the speed change steps. Furthermore, the shafts for the respective gears are supported at both ends, so that the transmission efficiency of the gears is high and superior in constructional strength. Therefore, the speed change device according to the invention is easy to manufacture and durable in use.

According to the invention, at least three shafts 13a are provided in a circle on the carrier 11 and rollers 18a and 18b are rotatably arranged on the shafts 13 for supporting the stepped portions 16b and 16c formed inner circumference of the driven rotary body 16, thereby securely supporting the driven rotary body 16 and making smooth the engagement and rotation of the internal gear 16a and planet gears 15.

Moreover, according to the invention the fixed bearing 5 enclosing the crankshaft 6 is formed in its outer circumference with serrations 20 and the pawl sleeve 19 provided in an outer circumference with a plurality of pawls is formed in the inner circumference with serration 20 and is detachably fitted on the fixed bearing 5. Therefore, the most of the parts already assembled may be finally fitted into a frame assembly of a bicycle, so that the assembling and disassembling of the device are very easy for the purpose of manufacturing or maintenance of the device.

According to the invention, the pawl sleeve 19 is fitted on the fixed bearing 5 enclosing the crankshaft 6 through the serrations 20, and one-way clutches 25, 26 and 27 are provided between the pawl sleeve 19 and the sun gears 22, 23 and 24. Further, the speed change cylinder 21 is provided for controlling these one-way clutches 25, 26 and 27. The shift arm 28 is engaged with one end ff the speed change cylinder 21 and fixed thereto by the snap ring. Therefore, after the speed change cylinder 21, the pawl sleeve 19, the plurality of sun gears 22, 23 and 24 and the plurality of one-way clutches 25, 26 and 28 have been assembled, this assembly is fitted and connected with the shift arm 28 by means of the snap ring 29 in a simple manner. Therefore, the device is easy to assemble for manufacturing and maintenance of the device and therefore the device becomes superior in quality.

According to the invention, the pawl sleeve 19 is fitted on the fixed bearing 5 enclosing the crankshaft 6, and a speed change cylinder 21 is rotatably fitted between the pawl sleeve 19 and the sun gears 22, 23 and 24. Moreover, the pawl sleeve 19 is provided on its outer circumference with a plurality of pawls 25a, 26a and 27a extensible and retractable in opposition to the sun gears and the speed change cylinder 21 is formed with openings 21a, 21b and 21c corresponding to the pawls to form the one-way clutches 25, 26 and 27 corresponding to the sun gears 22, 23 and 24, thereby selectively connecting one of the one-way clutches 25, 26 and 27 by rotating operation of the speed change cylinder 21. Therefore, the control of the respective one-way clutches 25, 26 and 27 can be smoothly effected by means of the speed change cylinder 21 which is thin and of light weight but has a high strength. Moreover, as the openings 21a, 21b and 21c through which the pawls 25a, 26a and 27a are extended or retracted are independently distributed in the speed change cylinder, edges of the openings have enough strength to resist forces of the pawls tending to extend out of the speed change cylinder. Moreover, the one-way clutch includes a plurality of pawls to improve the balancing of forces when engaged and therefore the device becomes durable in use.

According to the invention, the carrier 11 is provided on its outer circumference with a projection 11a as a gear cover. Moreover, there are provided dust protection seals 37, 38, 39 and 40 between the carrier 11 and the driven rotary body 16, between the driven rotary body 16 and the outer circumference of the ring plate 14 integrally connected to the carrier 11, between the inner periphery of the ring plate 14 and the outer periphery of the ring portion 28a of the shift arm 28 for controlling the one way clutches for the sun gears and between the inner periphery of the ring portion 28a of the shift arm 28 and the outer circumference of the fixed bearing 5. Therefore, clothes of a cyclist are prevented from being carried along by a projection 11a of the carrier into spaces between the sprocket 16d and the chain 41. Moreover, the respective dust protecting seals 37, 38, 39 and 40 surely prevent the dust, muddy water and the like from entering the device. Therefore, according to the invention it is possible to improve the safety in riding on a bicycle and simultaneously the durability of the bicycle.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A speed change device for a bicycle, comprising a carrier jointed to a crank arm, a plurality of planet gears rotatably supported on a plurality of shifts arranged in a circle on said carrier, each of said planet gears including a plurality of planet gear elements different in number of teeth, an internal gear in mesh with one of said planet gear elements of each of the planet gears and formed in an outer circumference with a sprocket to form a driven rotary body, rotary body one-way clutches for connecting said driven rotary body to said carrier, a plurality of sum gears provided on a crankshaft and in mesh with said planet gear elements of said planet gears, respectively, sun gear one-way clutches provided between inner circumferences of said sun gears and a fixed bearing enclosing said crankshaft, said sun gear one-way clutches being selectively connectable to selectively bring said sun gears into engagement with corresponding said planet gear elements, a pawl sleeve in the form of a hollow cylinder, said pawl sleeve being fitted on said fixed bearing, and a speed change cylinder rotatably fitted between said pawl sleeve and the sun gears, said pawl sleeve having a plurality of extendable and retractable pawls, said speed change cylinder being formed with openings corresponding to said pawls such that said sun gear one-way clutches may be selectively connected by rotating said speed change cylinder.

2. A speed change cylinder device as set forth in claim 1, wherein said device further comprises at least three shafts provided in a circle on said carrier and rollers rotatably arranged on said shafts for supporting an inner circumference of said driven rotary body.

3. A speed change device as set forth in claim 1, wherein said fixed bearing is formed in its outer circumference with serrations and said pawl sleeve is formed in its inner circumference with serrations and is detachably fitted on said fixed bearing.

4. A speed change device as set forth in claim 3, wherein said pawls are provided on an outer circumference of said pawl sleeve and ratchet teeth of said sun gear one-way clutches are provided in the inner circumferences of said sun gears.

5. A speed change device as set forth in claim 3, wherein said speed change cylinder is connected to a shift arm for changing speeds.

6. A speed change device as set forth in claim 1, wherein the device further comprises dust protective seals between said carrier and said driven rotary body, between an outer circumference of a ring plate located on a side opposite to said carrier and said driven rotary body, between an inner periphery of said ring plate and an outer periphery of a ring portion of a shift arm for controlling said sun gear one-way clutches for said sun gears, and between an inner periphery of said ring portion of said shift arm and an outer circumference of said fixed bearing.

7. A speed change device for a bicycle, comprising a carrier jointed to a crank arm, a plurality of planet gears rotatably supported on a plurality of shafts arranged in a circle on said carrier, each of said planet gears including a plurality of planet gear elements different in number of teeth, an internal gear in mesh with one of said planet gear elements of each of the planet gears and formed in an outer circumference with a sprocket to form a driven body, rotary body one-way clutches for connecting said driven rotary body to said carrier, a plurality of sun gears provided on a crankshaft and in mesh with said planet gear elements of said planet gears, respectively, sun gear one-way clutches provided between inner circumference of said sun gears and a fixed bearing enclosing said crankshaft, said sun gear one-way clutches being selectively connectable to selectively bring said sun gears into engagement with corresponding said planet gear elements, a pawl sleeve fitted on said fixed bearing, and a speed change member fitted between said pawl sleeve and the sun gears, said pawl sleeve having a plurality of extendable and retractable pawls, said speed change member being formed with openings corresponding to said pawls such that said sun gear one-way clutches may be selectively connected by adjusting the position of either of said pawl sleeve and said speed change member.

* * * * *